United States Patent [19]

Eum

[11] Patent Number: 5,774,300
[45] Date of Patent: Jun. 30, 1998

[54] DECK MECHANISM FOR MAGNETIC RECORDING/REPRODUCING APPARATUS WHICH IS CAPABLE OF DRIVING A PLURALITY OF TAPE-GUIDING DEVICES

[75] Inventor: Jae-yong Eum, Suwon, Rep. of Korea

[73] Assignee: Samsung Electronics Co., Ltd., Kyungki-do, Rep. of Korea

[21] Appl. No.: 628,329

[22] Filed: Apr. 5, 1996

[30] Foreign Application Priority Data

May 18, 1995 [KR] Rep. of Korea ...................... 95-12458

[51] Int. Cl.⁶ ............................ G11B 5/265; G11B 5/008
[52] U.S. Cl. ............................................. 360/85; 360/963
[58] Field of Search ................................ 360/85, 95, 96.3

[56] References Cited

U.S. PATENT DOCUMENTS

| | | | |
|---|---|---|---|
| 4,320,879 | 3/1982 | Saitou et al. .......................... | 242/334.6 |
| 4,389,600 | 6/1983 | Milligan et al. ........................ | 360/90 |
| 4,635,146 | 1/1987 | Koda et al. ............................ | 360/85 |
| 4,807,064 | 2/1989 | Miyamoto et al. ....................... | 360/85 |
| 5,172,283 | 12/1992 | Fukuyama et al. ...................... | 360/85 |
| 5,233,489 | 8/1993 | Kim ..................................... | 360/85 |
| 5,291,351 | 3/1994 | Takita et al. .......................... | 360/85 |
| 5,486,958 | 1/1996 | Choi et al. ............................ | 360/85 |

FOREIGN PATENT DOCUMENTS

| | | |
|---|---|---|
| 0197603 | 10/1986 | European Pat. Off. . |
| 0435207 | 7/1991 | European Pat. Off. . |
| 0632440 | 1/1995 | European Pat. Off. . |

OTHER PUBLICATIONS

Patent Abstracts of Japan, Abstract of JP–A 3 063 955.
Patent Abstracts of Japan, Abstract of JP–A 2 276 049.

*Primary Examiner*—Stuart S. Levy
*Assistant Examiner*—David D. Davis
*Attorney, Agent, or Firm*—Sughrue, Mion, Zinn, Macpeak & Seas, PLLC

[57] ABSTRACT

A deck mechanism has a tape-guiding unit including a pinch roller, pole bases, a tension lever and an impedance roller. The tape-guiding unit is interlocked with a master cam gear and a main slide member. The deck mechanism is simple and can be accurately controlled.

16 Claims, 10 Drawing Sheets

DECK MECHANISM FOR MAGNETIC RECORDING/REPRODUCING APPARATUS WHICH IS CAPABLE OF DRIVING A PLURALITY OF TAPE-GUIDING DEVICES

BACKGROUND OF THE INVENTION

The present invention relates to a deck mechanism for a magnetic recording/reproducing apparatus and, more particularly, to a deck mechanism for a magnetic recording/reproducing apparatus and which is capable of driving a plurality of guiding devices for guiding a tape with a simplified structure.

Recording/reproducing apparatuses employing magnetic tape cassettes, e.g., videocassette recorders and camcorders, are generally provided with a plurality of tape-guiding devices.

As shown in FIGS. 1 and 2, the tape-guiding devices include a pair of pole bases 61 and 62 for extracting a tape from a tape cassette and loading the tape onto a head drum 60, a pinch roller 63 for pressing the tape onto a capstan motor shaft 65 such that the tape travels at a constant speed, a tension lever 66 for controlling the tension of the travelling tape, and an impedance roller 64 for stably guiding the travelling of the tape, which are all provided on a deck 80.

Pole bases 61 and 62 load and unload the tape while moving along guide rails 67 and 68, by means of a pair of loading gears 71 and 72 which are rotated by the force of a driving motor 70. Here, pole bases 61 and 62 are coupled to loading gears 71 and 72 by a plurality of link members (not shown). Pinch roller 63 is installed on a lever member 82 rotatably installed on the deck 80 and elastically biased by a torsion spring 81, and accordingly is elastically pressed against the capstan motor shaft 65.

Separation of the pinch roller 63 from the capstan motor shaft 65 is performed according to the tape unloading operation of the pole base 62.

A tension pole 66a is installed at one end of the tension lever 66. Tension lever 66 is connected to the deck 80 by a tension spring 69, and is rotatably installed on the deck 80. Tension lever 66 is always elastically biased clockwise by the tension spring 69.

The counterclockwise rotation of the tension lever 66 is performed according to the tape unloading operation of the pole base 61.

The above conventional deck mechanism is complicated and difficult to accurately control since the plurality of tape-guiding devices are installed to be driven independently.

SUMMARY OF THE INVENTION

Therefore, in order to overcome the above problems, it is an object of the present invention to provide a deck mechanism for a magnetic recording/ reproducing apparatus, which is simplified and can be controlled more accurately.

To achieve the above object, there is provided a deck mechanism for a magnetic recording/reproducing apparatus, comprising: a tape-guiding unit including a deck, a head drum being installed on the deck and having a plurality of magnetic heads mounted thereon, a pair of reel tables, installed on the deck, for seating a tape thereon, a reel driving motor for rotating the reel tables, a pair of pole bases, provided with guide rollers, for extracting the tape from a tape cassette and loading the tape onto the head drum, a capstan motor shaft protruding from the deck, a pinch roller for pressing the tape against the capstan motor shaft such that the tape travels at a constant speed, a tension lever, provided with a tension pole, for controlling the tension of the travelling tape, and an impedance roller for securely guiding the tape; and sequential driving means for sequentially interlocking the tape-guiding unit.

The sequential driving means comprises: a driving motor for generating a driving force; a master cam gear including a large-diameter gear portion connected to the driving motor for rotation about an axis, a small-diameter gear portion sharing the same rotation axis with the large-diameter gear portion, and a cam portion having an upper cam portion and a lower cam portion; a main slide member having a rack gear portion which engages with the small-diameter gear portion and operative for sliding movement laterally by interlocking with the master cam gear; a sector gear rotatably installed on the deck; first interlocking means for rotating the sector gear according to the movement of the main slide member; second interlocking means for loading and unloading the pair of pole bases by interlocking the pair of pole bases with the rotating sector gear; third interlocking means for pressing and detaching the pinch roller to and from the capstan motor shaft by interlocking the pinch roller with the main slide member; fourth interlocking means for interlocking the tension lever with the master cam gear; and fifth interlocking means for interlocking the impedance roller with the master cam gear, so that the tape-guiding unit is interlocked with the master cam gear and the main slide member.

The first interlocking means is constituted such that a protrusion is extended from a lower surface of the sector gear and the main slide member is formed with a first guide slot having a horizontal guide portion and a vertical guide portion coupled to the horizontal guide portion and into which the protrusion is inserted, so that when the main slide member moves, the protrusion of the sector gear moves along the first guide slot.

The second interlocking means comprises: a pair of first and second loading gears rotatably installed on the deck apart from each other by a predetermined distance, a plurality of link members for connecting the first and second loading gears to the pole bases, respectively, and an idler gear for connecting the first loading gear to the second loading gear, so that one of the first and second loading gears engages with the sector gear.

The third interlocking means comprises: a pinch lever which is rotatably installed on the deck and on which the pinch roller is installed, having a first extension pin extended from the lower surface of an end of the pinch lever and an extension piece bent downward from the other end thereof; a first lever member installed under the pinch lever, sharing the same rotation axis with the pinch lever, and having a second extension pin extended from the lower surface thereof; a second lever member installed under the first lever member, sharing the same rotation axis with the first lever member, and whose edge makes contact with the first extension piece of the pinch lever; a first spring for connecting the first extension pin of the pinch lever to the deck, such that the pinch roller is elastically biased to be separated from the capstan motor shaft; and a second spring for connecting the first lever member to the second lever member, the main slide member having a second guide slot having an inclined guide portion and a horizontal guide portion connected to the inclined guide portion and into which the second extension pin is inserted, so that as the main slide member moves, the first and second lever members and the pinch lever rotate.

The fourth interlocking means comprises: a cam pin formed on the upper surface of an upper cam portion of the master cam gear; a cam protrusion formed on the outer circumference surface of the upper cam portion; a first and second interlocking portions installed on the tension lever to interlock with the cam pin and the cam protrusion, respectively; a plate member fixed on the deck over the main slide member, on which the tension lever is rotatably installed; and a spring member for connecting the tension lever to the plate member, so that when the cam pin interlocks with the first interlocking portion, the tension lever is unloaded.

The fifth interlocking means comprises: a cam interlocking portion formed on the outer circumferential surface of a lower cam portion of the master cam gear; and a roller lever, being elastically biased to the outer circumferential surface of the lower cam portion and rotatably installed on the deck, for supporting the impedance roller, so that the master cam gear is interlocked with the roller lever, thereby moving the impedance roller.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE PREFERRED EMBODIMENT

Figure 1:
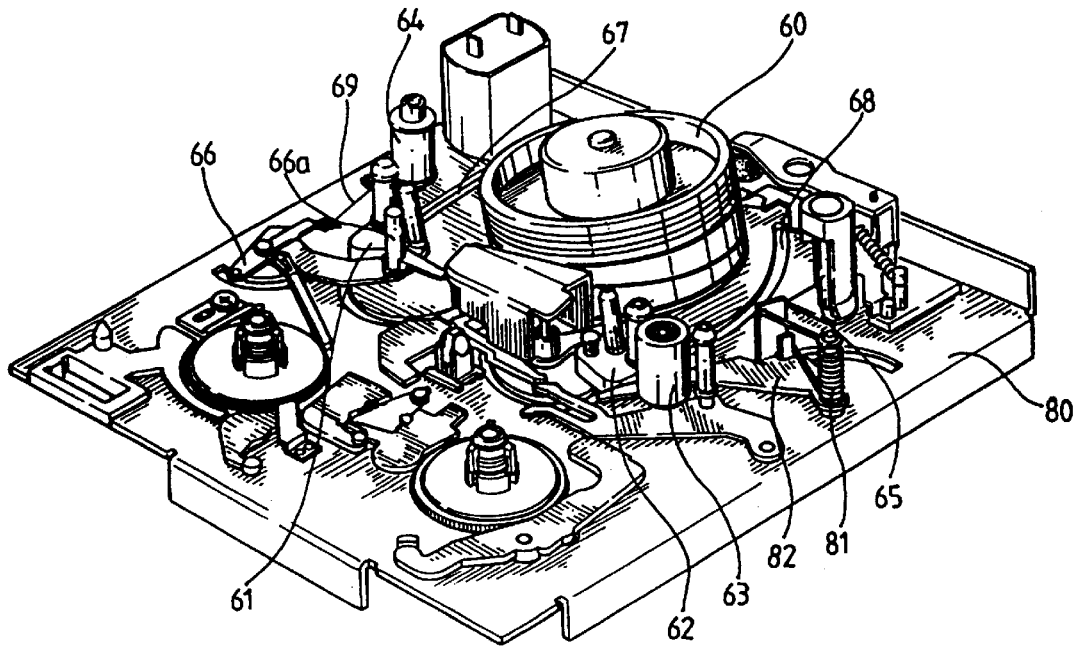
FIG. 1 is a perspective view of a conventional deck mechanism.
Figure 2:
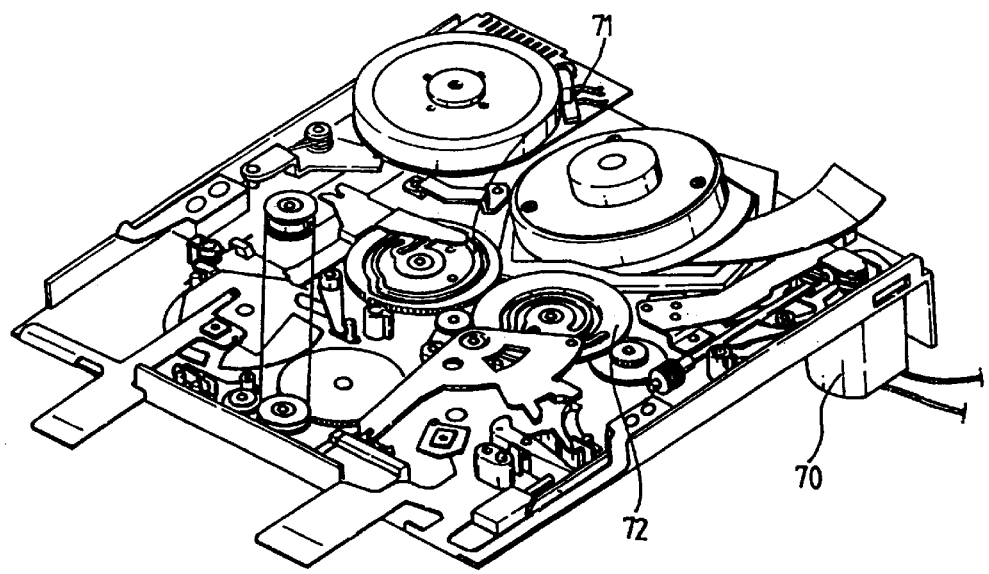
FIG. 2 is a bottom perspective view of the conventional deck mechanism of FIG. 1.
Figure 3:
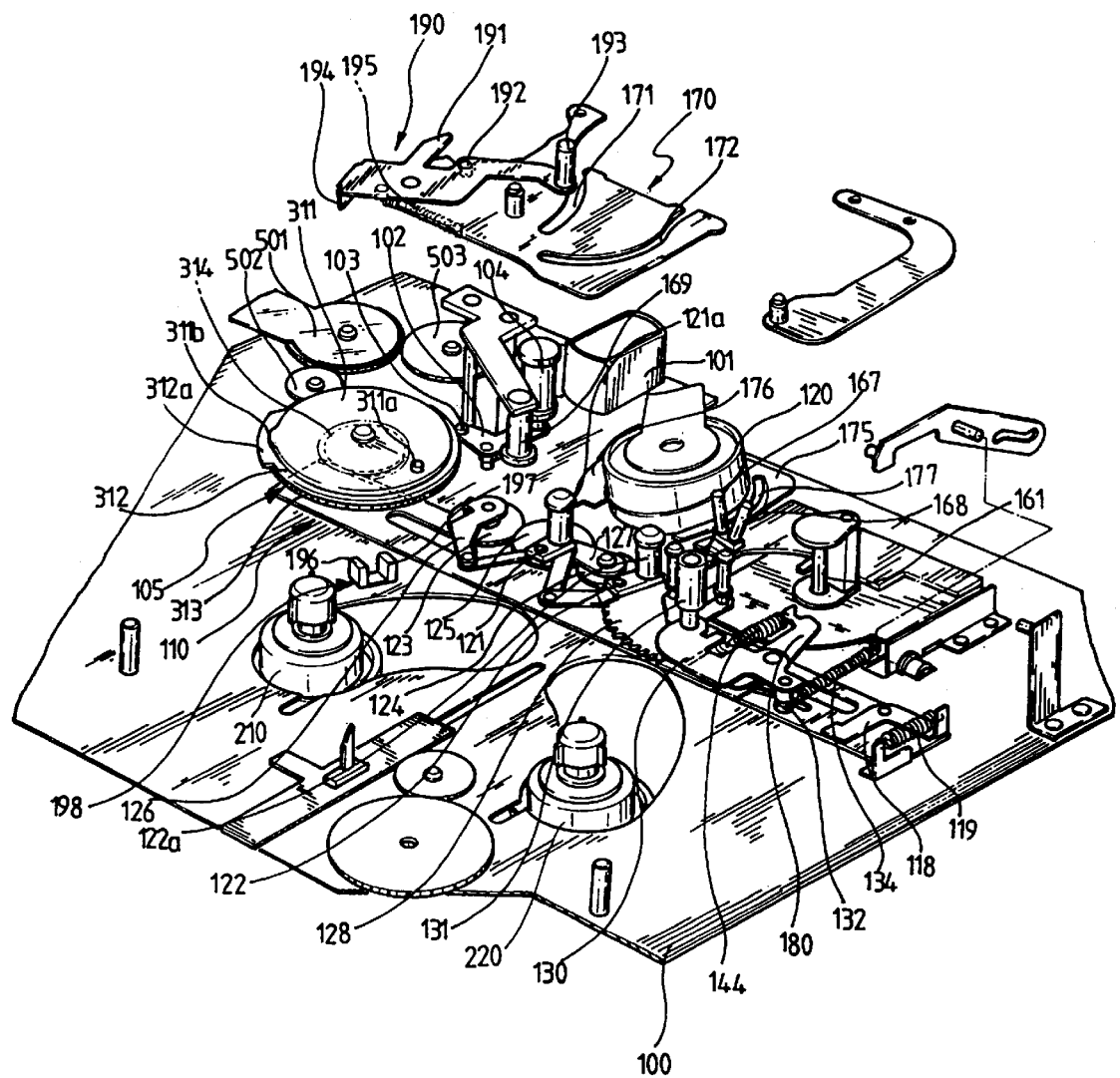
FIG. 3 is a perspective view of a deck mechanism according to the present invention.
Figure 15:
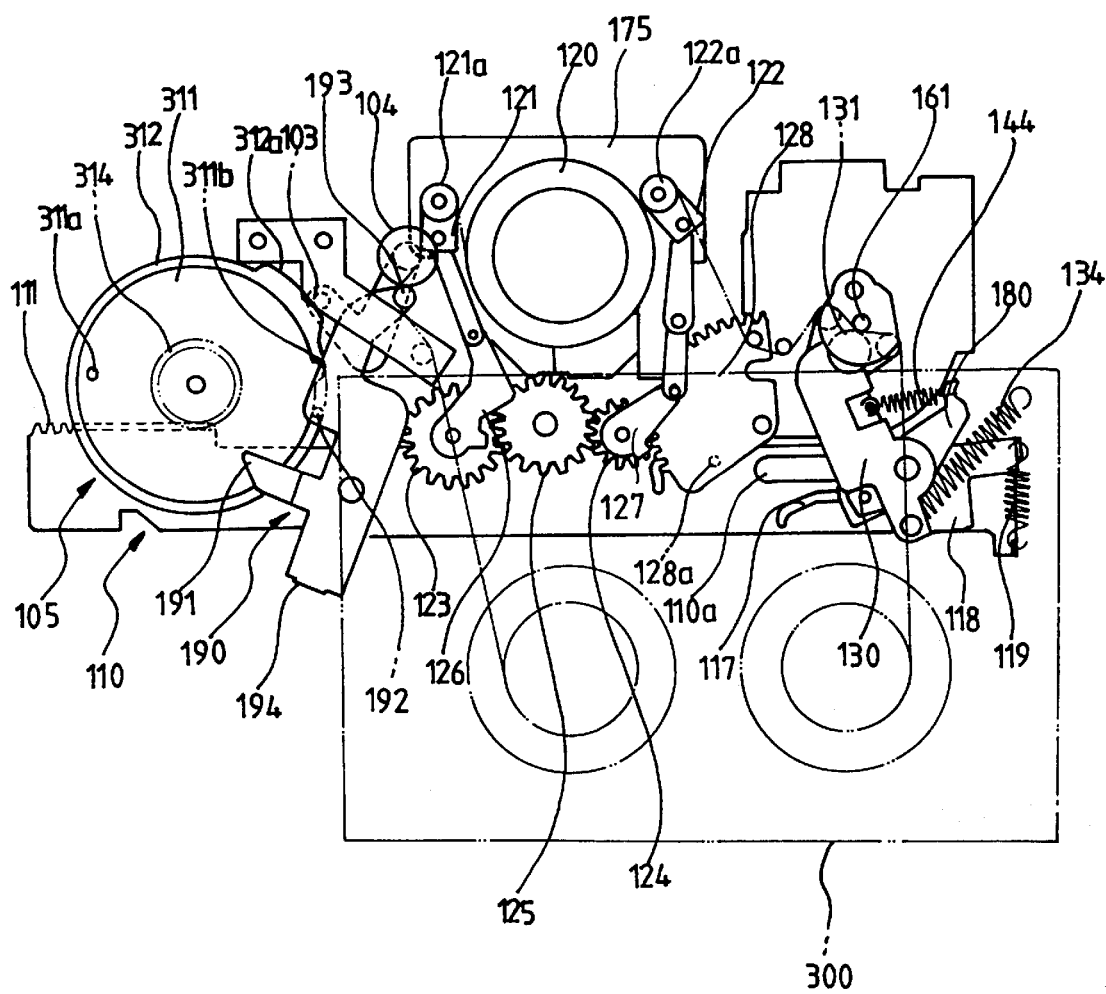
FIG. 15 is a schematic view of the deck mechanism according to the present invention, in a play mode.
Figure 16:
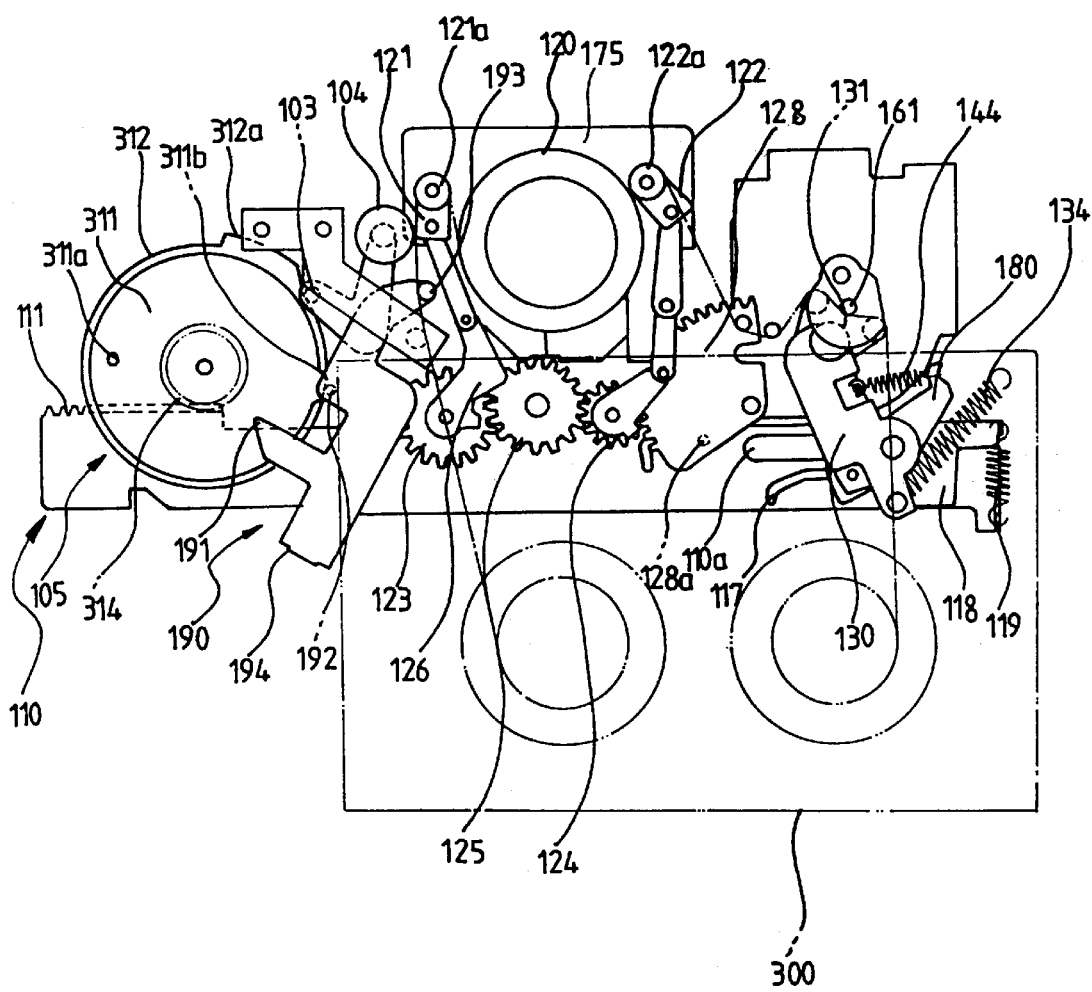
FIG. 16 is a schematic view showing the deck mechanism according to the present invention, in a fast-forward or rewinding mode.

FIG. 3 illustrates a deck mechanism according to the present invention, and FIGS. 15 and 16 illustrate the operations of the deck mechanism according to the present invention.

Referring to FIGS. 3, 15 and 16, a head drum 120 provided with a plurality of magnetic heads and reel tables 210 and 220 for seating a tape cassette 300 thereon are installed on a deck 100. Motors (not shown) for driving the reel tables may be installed under the deck.

A plurality of tape-guiding devices are installed on the deck 100. The tape-guiding devices include a pair of pole bases 121 and 122 having guide rollers 121a and 122a installed thereon for extracting a tape T from the tape cassette 300 and loading the tape onto the head drum 120, a capstan motor shaft 161 and pinch roller 131 for pressing the tape such that it travels at a constant speed, a tension lever 190 having a tension pole 193 installed thereon for controlling the tension of the travelling tape, and an impedance roller 104 for securely guiding the tape.

Meanwhile, according to one aspect of the present invention, the above tape-guiding devices are sequentially interlocked by predetermined sequential driving means. The sequential driving means is installed on the deck 100 as follows.

Figure 12:
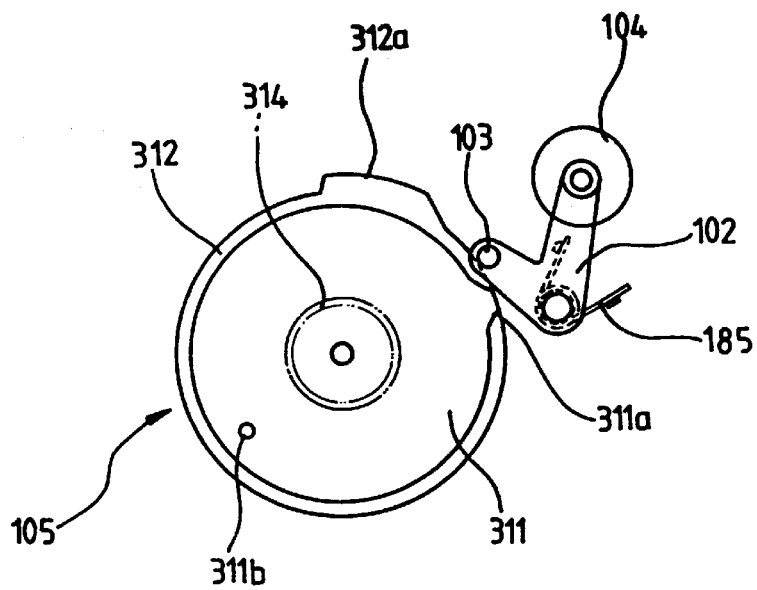
FIGS. 12 and 13 are operational views of an impedance roller interlocked with the master cam gear.
Figure 13:
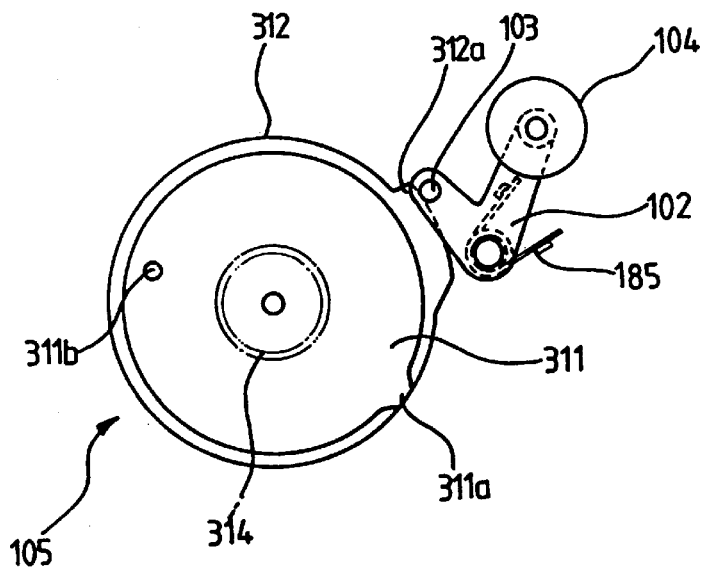
Figure 14:
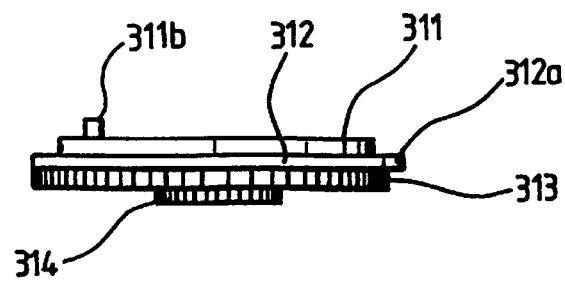
FIG. 14 is a sectional view of the master cam gear.

A driving motor 101 for generating a driving force is installed at the upper left of the head drum 120, in reference to FIG. 3. A master cam gear 105 is connected to the driving motor 101 by a mode gear 501 and a plurality of gear members 502 and 503. As shown in FIGS. 12, 13 and 14, the master cam gear 105 is comprised of a large-diameter gear portion 313 for engaging with the gear member 502, a small-diameter gear portion 314 sharing the same shaft with the large-diameter gear portion 313, an upper cam portion 311, and a lower cam portion 312.

Referring to FIGS. 4 through 7, a main slide member 110 having a rack gear potion 111 for engaging with the small-diameter gear potion 314 is installed on the deck 100 to slide laterally by interlocking with the master cam gear 105. A fan-shaped sector gear 128 is rotatably installed on the deck 100 by predetermined first interlocking means (described in detail below), on the main slide member 110.

There are also provided on the deck 100 second interlocking means for loading and unloading the pair of pole bases 121 and 122 by interlocking the pole bases 121 and 122 with the rotating sector gear 128, third interlocking means for pressing and detaching pinch roller 131 onto and from capstan motor shaft 161 by interlocking the pinch roller 131 with the main slide member 110, fourth interlocking means for interlocking the tension lever 190 with the master cam gear 105, and fifth interlocking means for interlocking the impedance roller 104 with the master cam gear 105.

Referring to FIGS. 4, 5, 6 and 7, the first interlocking means for interlocking the sector gear 128 with the main slide member 110 is comprised of a protrusion 128a extending from the lower surface of the sector gear 128, and a first guide slot 114 formed in the main slide member 110 having a horizontal guide portion 113 and a vertical guide portion 112 connected thereto and into which the protrusion 128a is inserted. Therefore, as the main slide member 110 moves, the protrusion 128a of the sector gear 128 moves along the first guide slot 114, thus rotating the sector gear 128.

Referring to FIG. 3, the second interlocking means for interlocking the pair of pole bases 121 and 122 with the sector gear 128 is comprised of a pair of loading gears 123 and 124 installed on the deck 100 to be spaced from each other by a predetermined distance, a plurality of link members 126 and 127 for connecting the first and second loading gears 123 and 124 to the pole bases 121 and 122, respectively, and an idler gear 125 for connecting the first loading gear 123 to the second loading gear 124. The second loading gear 124 is installed to engage with the sector gear 128. Therefore, when the sector gear 128 rotates by interlocking with main slide member 110, the first and second loading gears 123 and 124 rotate to load and unload the pole bases 121 and 122.

Figure 4:
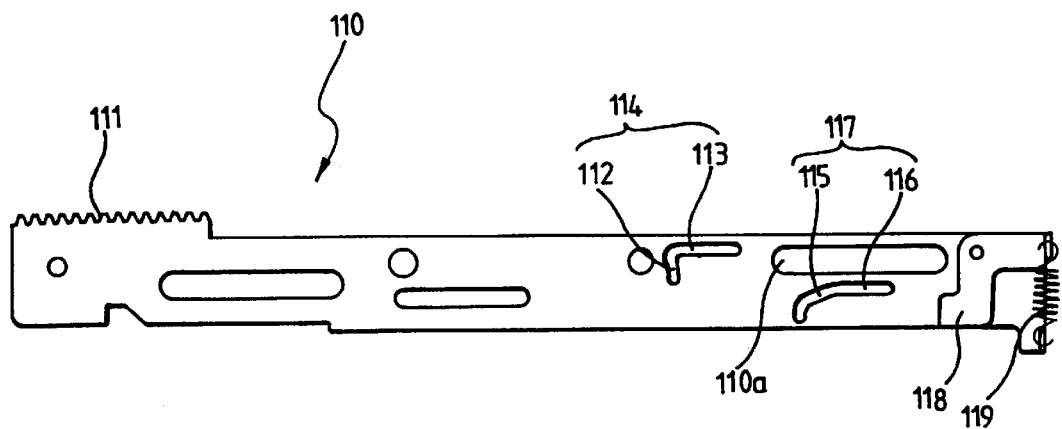
FIG. 4 is a plan view of a main slide member shown in FIG. 3.
Figure 8:
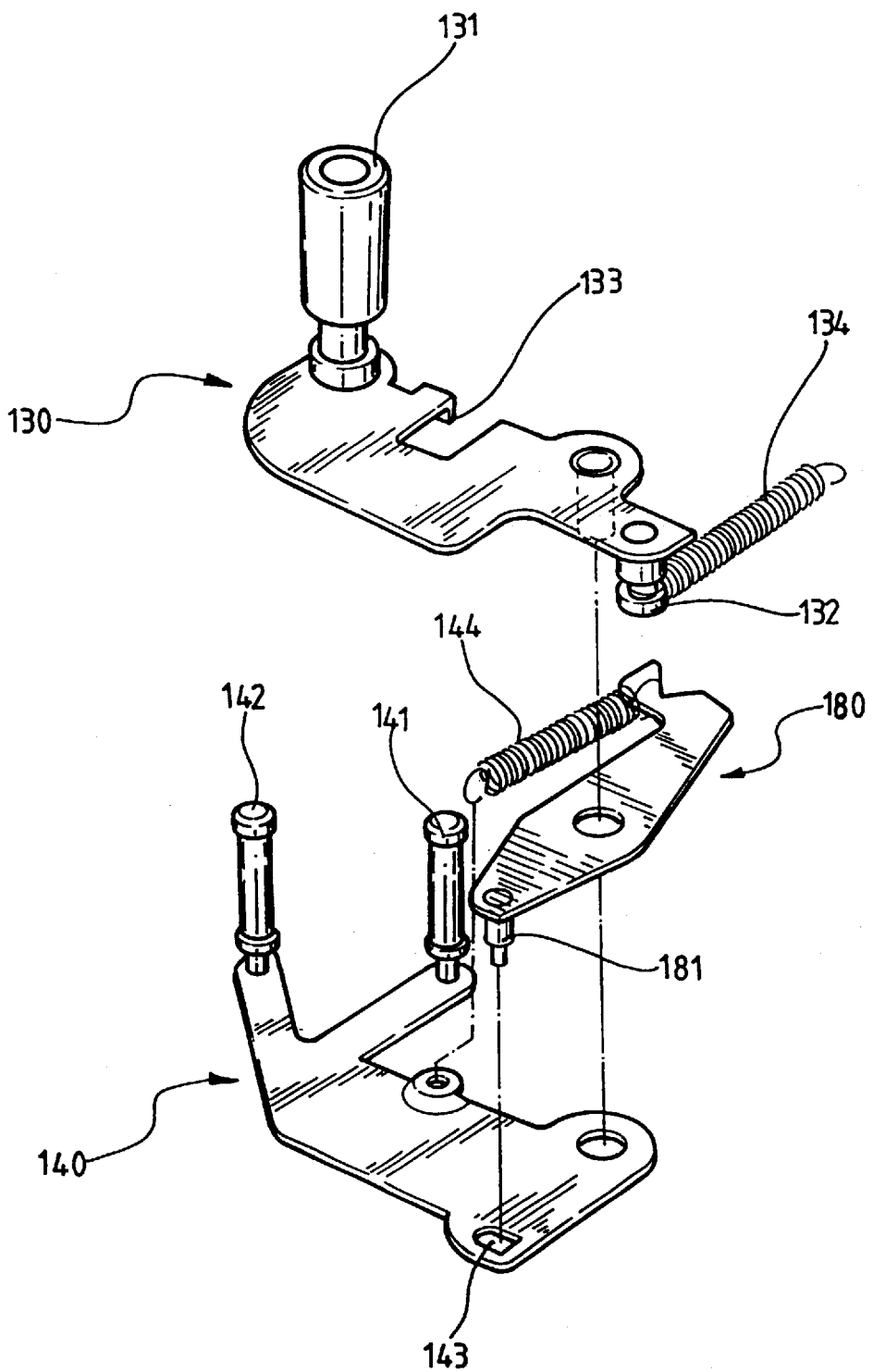
FIG. 8 is an exploded perspective view of an assembly of the pinch roller.

Referring to FIGS. 3, 4 and 8, the constitution of the third interlocking means will be described. A pinch lever 130 having the pinch roller 131 rotatably installed thereon is rotatably installed on the deck 100. A first extension pin 132 is extended from the lower surface of one end of the pinch lever 130, and an extension piece 133 is bent downward from the other end of the pinch lever 130. A first lever member 180 is installed under the pinch lever 130, sharing the same rotation axis of the pinch lever 130. A second extension pin 181 is extended from the lower surface of the first lever member 180. A second lever member 140 is installed under the first lever member 180 and connected to the pinch lever 130 and the first lever member 180 on the same rotation axis. A through-hole 143 into which the second extension pin 181 fits is formed in one end portion of the second lever member 140. Extension piece 133 of the pinch lever 130 makes contact with an edge of the second lever member 140. A first spring 134 for connecting first extension pin 132 to the deck 100 is installed at the pinch lever 130 to elastically bias the pinch roller 131 so that pinch roller 131 retreats from the capstan motor shaft 161. A second spring 144 is installed for connecting the first lever member 180 and the second lever member 140. A second guide slot 117 is formed to be combined with the second extension pin 181 in the main slide member 110 (see FIG. 4). Second guide slot 117 is comprised of an inclined guide portion 115 and a horizontal guide portion 116. Therefore, as the main slide member 110 moves, the first lever member 180 rotates. The second lever member 140 and the pinch lever 130 rotate together with the first lever member 180 by the second spring 144 and the extension piece 133. Reference numeral 110a in FIG. 4 denotes a third guide slot into which the rotation supporting shaft of the pinch lever 130, the first lever member 180, and the second lever member 140 is inserted.

Referring to FIGS. 3, 9, 10 and 11, the constitution of the fourth interlocking means for interlocking the tension lever 190 with the master cam gear 105 will be described.

A cam pin 311a is formed on the upper surface of the upper cam portion 311 in the master cam gear 105, and a cam protrusion 311b is extended from the outer circumferential surface of the upper cam portion 311. Tension lever 190 is provided with a first interlocking portion 191 for interlocking with cam pin 311a and a second interlocking portion 192 for interlocking with cam protrusion 311b. Second interlocking portion 192 is formed on the lower surface of the tension lever 190. A plate member 170 is fixed to the deck 100, over the main slide member 110. Tension lever 190 is rotatably installed in the plate member 170, and connected to the plate member 170 with a spring 195.

Figure 9:
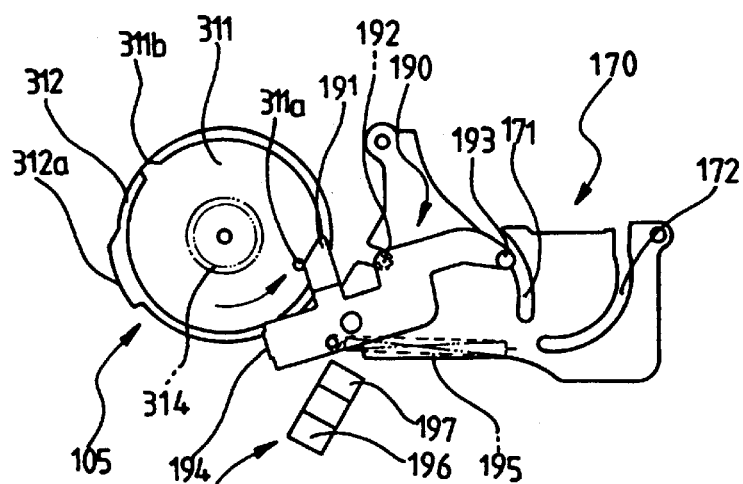
FIGS. 9, 10 and 11 are operational views of a tension lever interlocked with a master cam gear.

As shown in FIG. 9, the fourth interlocking means as constituted above unloads the tension lever 190, when the first interlocking portion 191 is interlocked with the cam pin 311a.

Referring to FIGS. 12, 13 and 14, the fifth interlocking means for interlocking the impedance roller 104 with the master cam gear 105 is constituted as follows.

A cam interlocking portion 312a is formed on the outer circumferential surface of the lower cam portion 312 in the master cam gear 105. A roller lever 102 having the impedance roller 104 installed thereon is rotatably installed on the deck 100 adjacent to the master cam gear 105, and is V-shaped. Impedance roller 104 is installed on one end of the roller lever 102, and a protrusion 103 is formed on the other end thereof. The rotation supporting shaft of the roller lever 102 is combined with a torsion spring 185 so that protrusion 103 is elastically biased against the outer circumferential surface of the lower cam portion 312 in the master cam gear 105. Therefore, when the protrusion 103 is brought into contact with the cam interlocking portion 312a of the master cam gear 105, the roller lever 102 rotates.

Pressing means is further provided to securely press the pinch roller 131 onto the capstan motor shaft 161.

As shown in FIG. 3, the pressing means includes a pressing lever member 118 rotatably installed on the main slide member 110 and a spring member 119 installed between an end portion of the pressing lever member 118 and the main slide member 110. Therefore, when the main slide member 110 moves, the other end portion of the pressing lever member 118 presses the first extension pin 132 of the pinch lever 130. Thus, the pinch roller 131 is more tightly pressed against the capstan motor shaft 161.

As shown in FIGS. 3 and 8, a guide roller 141 and a guide post 142 for guiding the tape T are installed on the second lever member 140. Guide post 142 and guide roller 141 guide the tape T, adjacent to the pinch roller 131 and the capstan motor shaft 161 which are pressed against each other, respectively.

In addition, referring to FIGS. 3 and 15–18, an upper guide block 175 having upper guide rails 176 and 177 formed thereon for guiding the pole bases 121 and 122, respectively, is installed around the outer circumference of the head drum 120. Lower guide rails 171 and 172 are installed in the plate member 170 and are connected to upper guide rails 176 and 177, for guiding the pole bases 121 and 122, respectively.

Figure 17:
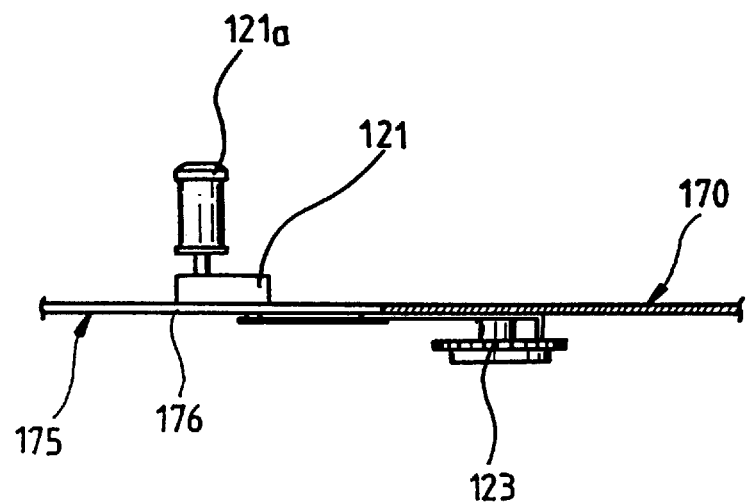
FIGS. 17 and 18 are sectional views of a guide rail portion for the pole bases.
Figure 18:
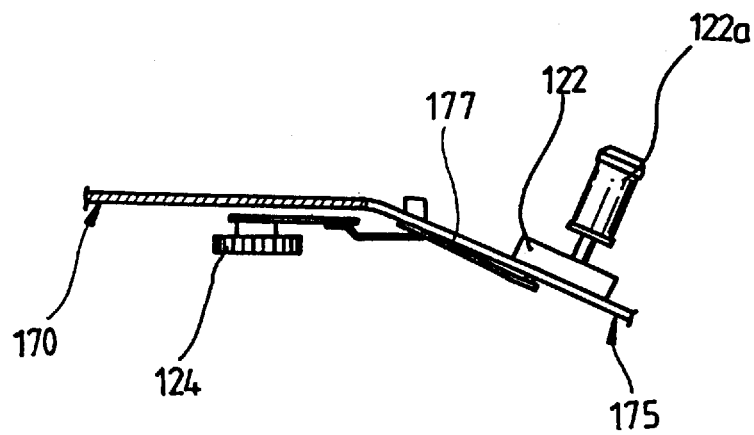

The head drum 120 is inclined toward the rear left thereof. Therefore, as shown in FIG. 17, the upper guide rail 176 is horizontal, and as shown in FIG. 18, the upper guide rail 177 is inclined in the same direction that the head drum 120 is inclined.

Meanwhile, speed controlling means is further provided for controlling the rotative speed of the reel tables 210 and 220, according to the rotative angle of the tension lever 190. The speed controlling means is constituted as follows. Referring to FIGS. 3, 9, 10 and 11, a blocking board 194 is downwardly bent from an end portion of the tension lever 190. A sensor member 198 is formed on the deck 100, corresponding to the rotative path of the blocking board 194, and has a light-emitting portion 197 and a light-receiving portion 196. Therefore, when the blocking board 194 passes between the light-receiving portion 196 and the light-emitting portion 197, the amount of light received by the light-receiving portion 196 varies. The received light is converted into an electrical signal and applied to the reel table driving motors (not shown). Then, the speed of the reel tables 210 and 220 is controlled according to the amount of current applied thereto.

The operations and effects of the deck mechanism for a magnetic recording/reproducing apparatus according to the present invention will be described.

Tape Unloading

Figure 5:
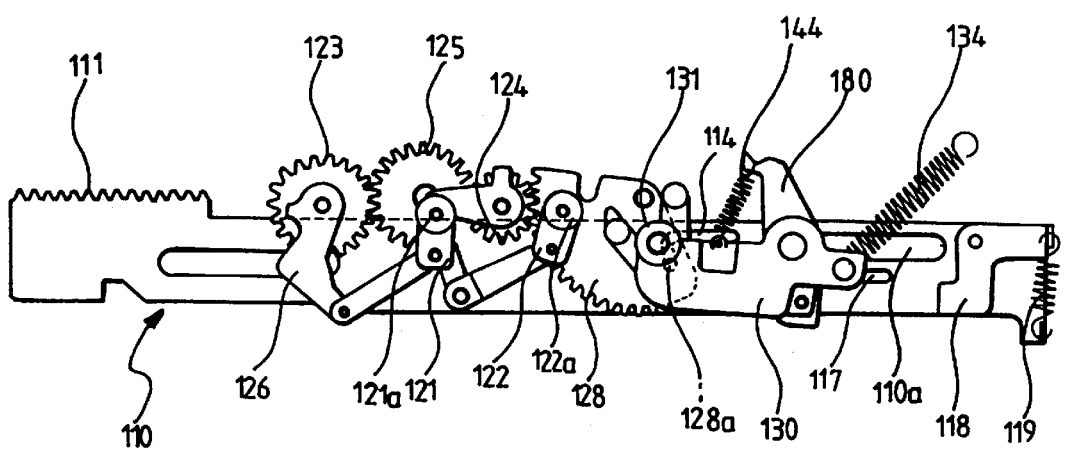
FIGS. 5, 6 and 7 are operational views of a pole base and a pinch roller which are interlocked with the main slide member.

Referring to FIGS. 3 and 5, the main slide member 110 is located at its extreme right position in reference to FIG. 3. Protrusion 128a of the sector gear 128 is located at the lower end of the vertical guide portion 112 of the first guide slot 114, and the pole bases 121 and 122 are located at the lower ends of the lower guide rails 171 and 172, respectively.

Referring to FIGS. 3, 5 and 8, the second interlocking pin 181 of first lever member 180 is located at the lower end of the inclined guide portion 115, and the pinch lever 130 is rotated counterclockwise by the first spring 134. At this stage, the second lever member 140 is also rotated by extension piece 133 of the pinch lever 130. Thus, the pinch roller 131 is separated from the capstan motor shaft 161.

As shown in FIG. 9, the tension lever 190 is rotated counterclockwise by interlocking with cam pin 311a of the master cam gear 105. In this position, the spring 195 is under tension.

Second interlocking portion 192 of the tension lever 190 makes contact with the plate member 170, and thus the tension lever 190 stops its counterclockwise rotation.

As shown in FIG. 12, the protrusion 103 of the roller lever 102 is pressed tightly against the outer circumferential surface of the lower cam portion 312 of the master cam gear 105, by the torsion spring 185.

Tape Loading

Figure 6:
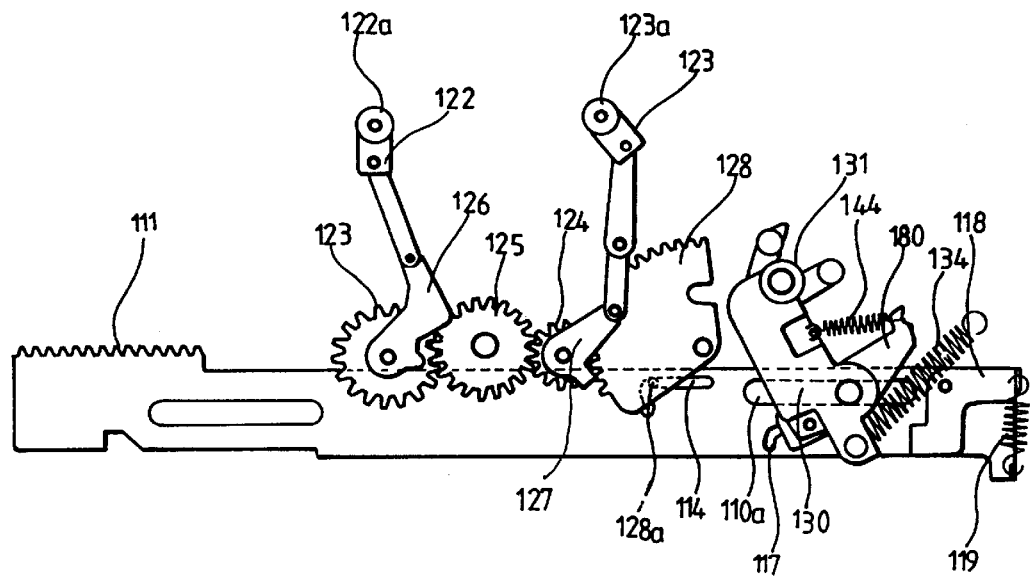
Figure 7:
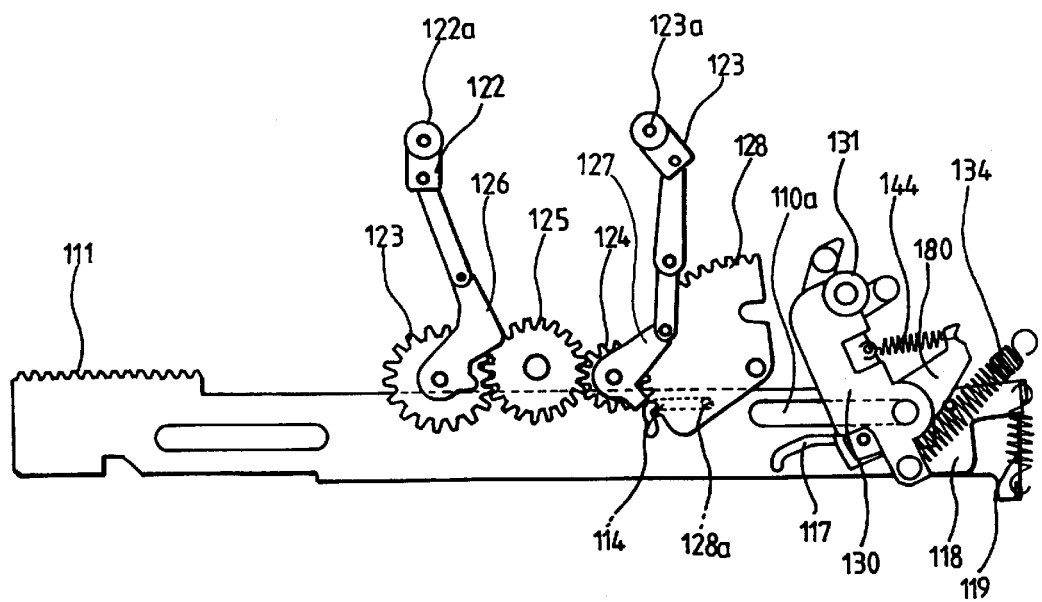

Referring to FIG. 3, when the master cam gear 105 rotates clockwise by the motor 101, the main slide member 110 moves to the left in reference to the drawing. The protrusion 128a of the sector gear 128 is guided along the first guide slot 114 of the main slide member 110. Thus, the sector gear 128 rotates clockwise, as shown in FIGS. 5, 6 and 7. When the sector gear 128 rotates clockwise by interlocking with the main slide member 110, first and second loading gears 123 and 124 rotate counterclockwise. The guide rollers 121a and 122a installed on the first and second loading gears 123 and 124 extract the tape T from the cassette 300 and load it onto the head drum 120.

During the loading operation of the tape T, the second extension pin 181 of the first lever member 180 is interlocked with the second guide slot 117 of the main slide member 110. The first lever member 180 rotates clockwise, and the second lever member 140 rotates counterclockwise by the force of the second spring 144 connected to the first lever member 180. Pinch lever 130 rotates together with second lever member 140 by extension piece 133. Here, when the tape T is completely loaded, pinch roller 131 remains slightly apart from the capstan motor shaft 161.

As shown in FIG. 9, when the master cam gear 105 rotates counterclockwise with the tension lever 190 unloaded, the first interlocking portion 191 of the tension lever 190 is detached from cam pin 311a. The tension lever 190 rotates counterclockwise by the force of spring 195.

While the master cam gear 105 rotates counterclockwise, the protrusion 103 of the roller lever 102 slides against the outer circumferential surface of the lower cam portion 312 of the master cam gear 105 by torsion spring 185. At this stage, the protrusion 103 does not touch the cam interlocking portion 312a of the master cam gear 105.

Play

Referring to FIGS. 3, 7 and 15, the master cam gear 105 rotates counterclockwise by the motor 101, and then the main slide member 110 moves further to the left in reference to FIG. 3. At the same time, the first lever member 180 guided along the second guide slot 117 of main slide member 110 rotates clockwise a little more. Thus, the second lever member 140 and the pinch lever 130 also rotate slightly clockwise. Accordingly, the pinch lever 131 is pressed against the capstan motor shaft 161.

When the main slide member 110 moves to the left and pinch roller 131 is pressed against the capstan motor shaft 161, the first extension pin 132 of the pinch lever 130 makes contact with the end portion of the pressing lever member 118. Then, the pressing lever member 118 rotates counterclockwise, while in contact with the first extension pin 132, by the movement of the main slide member 110. Since the pressing lever member 118 is elastically biased clockwise by the restoring force of the spring 119, the pinch roller 131 remains securely pressed against the capstan motor shaft 161.

Figure 11:
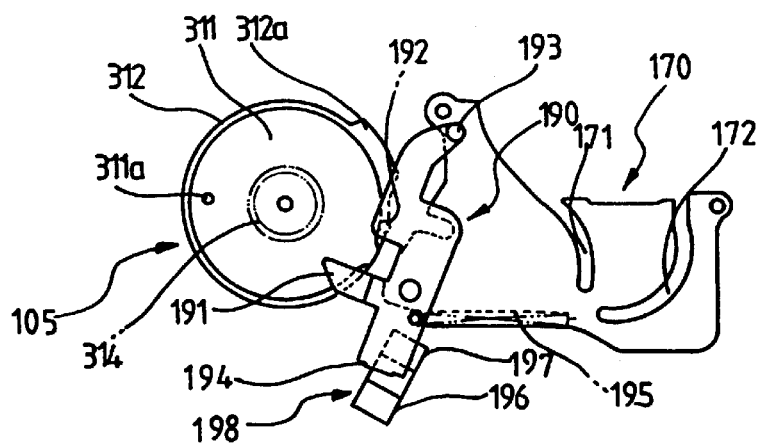

As shown in FIG. 11, the second interlocking portion 192 of tension lever 190 is brought into contact with the outer circumferential surface of the upper cam portion 311 of master cam gear 105 by the spring 195. The blocking board 194 of the tension lever 190 is located between the light-receiving portion 196 and the light-emitting portion 197 of the sensor member 198.

As shown in FIG. 13, the protrusion 103 of the roller lever 102 is interlocked with the cam interlocking portion 312a of the master cam gear 105. Therefore, the roller lever 102 rotates clockwise. The impedance roller 104 securely guides the tape T, as shown in FIG. 15.

In the play mode, the tape T travels from the guide pole 169 to the guide post 141, through the tension pole 193, impedance roller 104, guide roller 121a, head drum 120, guide roller 122a, inclined guide pins 167 and 168, the guide post 142, and the pinch roller 131 and the capstan motor shaft 161. During the play operation, the tension of the tape T varies with the wound length of the tape T. Thus, tension lever 190 rotates clockwise or counterclockwise according to the tension of the tape T. The blocking board 194 of the tension lever 190 changes the amount of light reaching the light-receiving portion 196, which is converted into an electrical signal and applied to the reel driving motors. Therefore, the reel tables 210 and 220 can be driven at a controlled speed to properly maintain the tape tension.

Fast Forward and Rewind

Referring to FIGS. 3 and 16, the master cam gear 105 rotates slightly to the right in the reference to the drawings by reverse rotation of the motor 101. Therefore, the main slide member 110 moves slightly to the right. The first extension pin 132 of the pinch lever 130 is separated from the pressing lever member 118, and the pinch lever 130 rotates counterclockwise by the force of the first spring 134. Thus, the pinch roller 131 is slightly separated from the capstan motor shaft 161.

Figure 10:
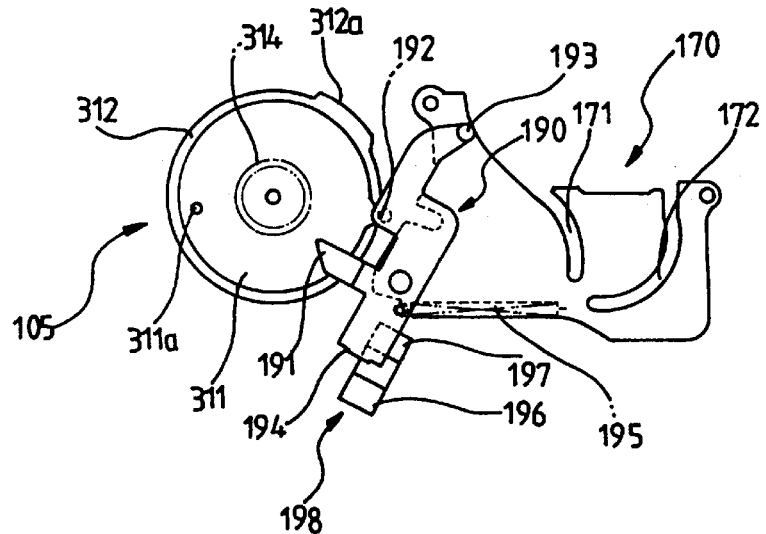

As shown in FIG. 10, the second interlocking portion 192 of the tension lever 190 makes contact with the cam protrusion portion 311b by the counterclockwise rotation of the master cam gear 105. The tension lever 190 rotates clockwise, thus releasing the tension of the tape T.

As shown in FIG. 12, the protrusion 103 of the roller lever 102 is detached from the cam interlocking portion 312a. Therefore, the roller lever 102 rotates counterclockwise, moving the impedance roller 104 slightly to the left.

Thus, the tape T rapidly travels by the reel driving motors.

As described above, since in the deck mechanism for a magnetic recording/reproducing apparatus, the above plurality of guiding devices are interlocked with the master cam gear 105 and the main slide member 110, the deck mechanism is simplified and can be accurately controlled.

It is contemplated that numerous modifications may be made to the deck mechanism of the present invention without departing from the spirit and scope of the invention as defined in the following claims.

What is claimed is:

1. A deck mechanism for a magnetic recording/reproducing apparatus, comprising:

a tape-guiding unit including a plurality of guiding devices including a deck, a head drum being installed on said deck and having a plurality of magnetic heads mounted thereon, a pair of reel tables, installed on said deck, for seating a tape thereon, a reel driving motor for rotating said reel tables, a pair of pole bases, provided with guide rollers, for extracting said tape from a tape cassette and loading said tape onto said head drum, a capstan motor shaft protruding from said deck, a pinch roller for pressing said tape against said capstan motor shaft such that said tape travels at a constant speed, a tension lever, provided with a tension pole, for controlling the tension of said travelling tape, and an impedance roller for securely guiding said tape; and sequential driving means for sequentially interlocking said guiding devices of said tape-guiding unit including a master cam gear which cooperates with said tension lever;

wherein said sequential driving means comprises:

a driving motor for generating a driving force;

said master cam gear including a large-diameter gear portion connected to said driving motor for rotation about an axis, a small-diameter gear portion sharing the same rotation axis with said large-diameter gear portion, and a cam Portion having an upper cam portion and a lower cam portion, wherein said master cam gear rotates according to the driving force of said driving motor;

a main slide member having a rack gear portion which engages with said small-diameter gear portion, said main slide member slides laterally relative to said master cam gear as said small-diameter gear portion of said master cam gear rotates;

a sector gear rotatable installed on said deck;

first interlocking means for rotating said sector gear according to the sliding movement of said main slide member;

second interlocking means for loading and unloading said pair of pole bases by engaging said pair of pole bases with said rotating sector gear according to the sliding movement of said main slide member;

third interlocking means for pressing and detaching said pinch roller to and from said capstan motor shaft by interlocking said pinch roller with said main slide member according to the sliding movement of said main slide member;

fourth interlocking means for interlocking said tension lever with said master cam gear according to the rotation of said master cam gear; and fifth interlocking means for interlocking said impedance roller with said master cam gear according to the rotation of said master cam gear, so that said guiding devices of said tape-guiding unit are sequentially interlocked as said master cam gear rotates, thus causing said main slide member to slide.

2. The deck mechanism for a magnetic recording/reproducing apparatus as claimed in claim 1, wherein said first interlocking means is constituted such that a protrusion is extended from a lower surface of said sector gear and said main slide member is formed with a first guide slot having a horizontal guide portion and a vertical guide portion coupled to said horizontal guide portion and into which said protrusion is inserted, so that when said main slide member moves, said protrusion of said sector gear moves along said first guide slot.

3. The deck mechanism for a magnetic recording/reproducing apparatus as claimed in claim 1, wherein said second interlocking means comprises a pair of first and second loading gears rotatably installed on said deck apart from each other by a predetermined distance, a plurality of link members for connecting said first and second loading gears to said pole bases, respectively, and an idler gear for connecting said first loading gear to said second loading gear, so that one of said first and second loading gears engages with said sector gear.

4. The deck mechanism for a magnetic recording/reproducing apparatus as claimed in claim 1, wherein said third interlocking means comprises:

a pinch lever which is rotatably installed on said deck and on which said pinch roller is installed, having a first extension pin extended from a lower surface of an end of said pinch lever and an extension piece bent downward from the other end thereof;

a first lever member installed under said pinch lever, sharing a rotation axis with said pinch lever, and having a second extension pin extended from a lower surface thereof;

a second lever member installed under said first lever member, sharing the rotation axis with said first lever member, and having an edge which makes contact with said extension piece of said pinch lever;

a first spring for connecting said first extension pin of said pinch lever to said deck, such that said pinch roller is elastically biased to be separated from said capstan motor shaft; and a second spring for connecting said first lever member to said second lever member, said main slide member having a second guide slot having an inclined guide portion and a horizontal guide portion connected to said inclined guide portion and into which said second extension pin is inserted, so that as said main slide member moves, said first and second lever members and said pinch lever rotate.

5. The deck mechanism for a magnetic recording/reproducing apparatus as claimed in claim 4, further comprising pressure-maintaining means for securely keeping said pinch roller pressed against said capstan motor shaft.

6. The deck mechanism for a magnetic recording/reproducing apparatus as claimed in claim 3, wherein said pressure-maintaining means comprises a pressing lever member rotatably installed on said main slide member, and a spring member for connecting an end portion of said pressing lever member to said main slide member, so that when said main slide member moves, the other end of said pressing lever member presses said first extension pin of said pinch lever.

7. The deck mechanism for a magnetic recording/reproducing apparatus as claimed in claim 4, wherein said second lever member has a plurality of guide rollers and a guide post, installed thereon.

8. The deck mechanism for a magnetic recording/reproducing apparatus as claimed in claim 1, wherein said fourth interlocking means comprises: a cam pin formed on an upper surface of an upper cam portion of said master cam gear; a cam protrusion formed on an outer circumferential surface of said upper cam portion; first and second interlocking portions installed on said tension lever to interlock with said cam pin and said cam protrusion, respectively; a plate member fixed on said deck over said main slide member, on which said tension lever is rotatably installed; and a spring member for connecting said tension lever to said plate member, so that when said cam pin interlocks with said first interlocking portion, said tension lever is unloaded.

9. The deck mechanism for a magnetic recording/reproducing apparatus as claimed in claim 8, wherein said plate member has guide rails installed thereon, for guiding said pair of pole bases, respectively.

10. The deck mechanism for a magnetic recording/reproducing apparatus as claimed in claim 8, further comprising speed controlling means for controlling the speed of said reel driving motors according to a rotative angle of said tension lever.

11. The deck mechanism for a magnetic recording/reproducing apparatus as claimed in claim 10, wherein said speed controlling means comprises a blocking board bent from an end portion of said tension lever, and a sensor member installed on said deck corresponding to a rotative path of said blocking board and having a light-receiving portion and a light emitting portion, so that light received by said light-receiving portion is converted into an electrical signal according to the location of said blocking board between said light-receiving portion and said light-emitting portion, and is applied to said reel driving motor, thereby controlling the speed of said reel driving motor.

12. The deck mechanism for a magnetic recording/reproducing apparatus as claimed in claim 1, wherein said fifth interlocking means comprises:

a cam interlocking portion formed on an outer circumferential surface of a lower cam portion of said master cam gear; and a roller lever, being elastically biased to the outer circumferential surface of said lower cam portion and rotatably installed on said deck, for supporting said impedance roller, so that said master cam gear is interlocked with said roller lever, thereby moving said impedance roller.

13. The deck mechanism for a magnetic recording/reproducing apparatus as claimed in claim 1, further comprising an upper guide block having upper guide rails for guiding said pair of pole bases, respectively, adjacent to an outer circumference of said head drum, and a plate member having lower guide rails for guiding said pair of pole bases, respectively, each lower guide rail being connected to one of said pole bases.

14. The deck mechanism for a magnetic recording/reproducing apparatus as claimed in claim 13, wherein said head drum is inclined in a preset direction, and one of said guide rails is inclined in the same preset direction as said head drum.

15. The deck mechanism for a magnetic recording/reproducing apparatus as claimed in claim 1, further comprising speed controlling means for controlling the speed of said reel driving motor according to a rotative angle of said tension lever.

16. The deck mechanism for a magnetic recording/reproducing apparatus as claimed in claim 15, wherein said speed controlling means comprises a blocking board bent from an end portion of said tension lever, and a sensor member installed on said deck corresponding to a rotative path of said blocking board and having a light-receiving portion and a light emitting portion, so that light received by said light-receiving portion is converted into an electrical signal according to the location of said blocking board between said light-receiving portion and said light-emitting portion, and is applied to said reel driving motor, thereby controlling the speed of said reel driving motor.

* * * * *